(12) United States Patent
Singh et al.

(10) Patent No.: US 8,406,757 B1
(45) Date of Patent: Mar. 26, 2013

(54) WIRELESS DEVICE NETWORK RESCAN RATE DETERMINATION BASED ON WIRELESS COVERAGE AVAILABILITY

(75) Inventors: Jasinder Pal Singh, Olathe, KS (US); Jason Peter Sigg, Overland Park, KS (US); Maulik K. Shah, Overland Park, KS (US); Ashish Bhan, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 118 days.

(21) Appl. No.: 13/074,577

(22) Filed: Mar. 29, 2011

(51) Int. Cl.
*H04W 4/00* (2009.01)

(52) U.S. Cl. ............... 455/432.1; 455/456.1; 455/434; 455/466; 370/331; 370/236; 370/237; 709/238; 709/239

(58) Field of Classification Search .......... 709/238, 709/239; 370/331, 235, 236, 237; 455/432.1, 455/456.1, 404.1, 434, 3.06, 410, 423
See application file for complete search history.

(56) References Cited

U.S. PATENT DOCUMENTS

| | | | |
|---|---|---|---|
| 5,119,502 | A | 6/1992 | Kallin et al. |
| 5,666,355 | A | 9/1997 | Huah et al. |
| 5,842,122 | A | 11/1998 | Schellinger et al. |
| 5,995,829 | A | 11/1999 | Broderick |
| 6,282,419 | B1 | 8/2001 | Findikli |
| 6,400,948 | B1 | 6/2002 | Hardin |
| 6,775,531 | B1 | 8/2004 | Kaewell et al. |
| 7,146,433 | B2 * | 12/2006 | Cromer et al. ............ 709/239 |
| 7,174,188 | B2 | 2/2007 | Kiyomoto et al. |
| 7,197,312 | B2 | 3/2007 | Gunaratnam et al. |
| 7,263,358 | B2 | 8/2007 | Chiou |
| 7,330,727 | B2 | 2/2008 | Korneluk et al. |
| 7,480,519 | B2 | 1/2009 | Jeong et al. |
| 7,593,727 | B2 | 9/2009 | Zhao et al. |
| 2003/0156558 | A1 * | 8/2003 | Cromer et al. ............ 370/331 |
| 2004/0224696 | A1 | 11/2004 | Korneluk et al. |
| 2006/0003768 | A1 | 1/2006 | Chiou |
| 2006/0258386 | A1 | 11/2006 | Jeong et al. |
| 2007/0047476 | A1 | 3/2007 | Zhao et al. |
| 2007/0218926 | A1 | 9/2007 | Zhuang et al. |
| 2007/0293244 | A1 | 12/2007 | Lee et al. |
| 2009/0274118 | A1 | 11/2009 | De Sanctis et al. |
| 2010/0067492 | A1 | 3/2010 | Kamei |

OTHER PUBLICATIONS

U.S. Appl. No. 12/759,739, filed Apr. 14, 2010.

* cited by examiner

*Primary Examiner* — Joseph Arevalo

(57) ABSTRACT

What is disclosed is a method of operating a wireless communication device. The method includes receiving home wireless access to communication services over a first wireless communication mode from a home wireless access node associated with a first wireless system identifier, and determining availability of roaming wireless access over a second wireless communication mode from a roaming wireless access node. The method also includes processing the first wireless system identifier to determine a first geographic group associated with the home wireless access node, and determining a network rescan timer for the roaming wireless access over the second wireless communication mode based on the first geographic group and the availability of the roaming wireless access.

16 Claims, 5 Drawing Sheets

US 8,406,757 B1

WIRELESS DEVICE NETWORK RESCAN RATE DETERMINATION BASED ON WIRELESS COVERAGE AVAILABILITY

TECHNICAL FIELD

Aspects of the disclosure are related to the field of communications, and in particular, determining wireless device network rescan rates in wireless communication networks.

TECHNICAL BACKGROUND

Wireless communication systems typically include wireless access nodes, such as base stations, which provide wireless access to communication services for user devices over wireless links. A typical wireless communication system includes many wireless access nodes to provide wireless access across a geographic region, with individual wireless coverage areas associated with each wireless access node. The wireless access nodes exchange user communications and overhead communications between wireless user devices and a core network of the wireless communication system.

Many different wireless carriers, such as cellular service companies, can operate wireless communication networks, and may allow wireless communication devices from one carrier to operate on another carrier. This process is typically referred to as roaming, and a wireless communication device intended for use on a first carrier network can roam to a second carrier network and still receive access to communication services through the second carrier network. Many times, the wireless coverage areas of both roaming and home carrier networks are located within the same geographic area. Wireless communication devices typically perform a network scan process to determine availability of wireless access from different wireless communication networks, as provided by the different wireless carriers.

OVERVIEW

What is disclosed is a method of operating a wireless communication device. The method includes receiving home wireless access to communication services over a first wireless communication mode from a home wireless access node associated with a first wireless system identifier, and determining availability of roaming wireless access over a second wireless communication mode from a roaming wireless access node. The method also includes processing the first wireless system identifier to determine a first geographic group associated with the home wireless access node, and determining a network rescan timer for the roaming wireless access over the second wireless communication mode based on the first geographic group and the availability of the roaming wireless access.

What is also disclosed is a wireless communication device. The wireless communication device includes a first transceiver configured to receive home wireless access to communication services over a first wireless communication mode from a home wireless access node associated with a first wireless system identifier. The wireless communication device also includes a second transceiver configured to determine availability of roaming wireless access over a second wireless communication mode from a roaming wireless access node. The wireless communication device also includes a processing system configured to process the first wireless system identifier to determine a first geographic group associated with the home wireless access node, and determine a network rescan timer for the roaming wireless access over the second wireless communication mode based on the first geographic group and the availability of the roaming wireless access.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
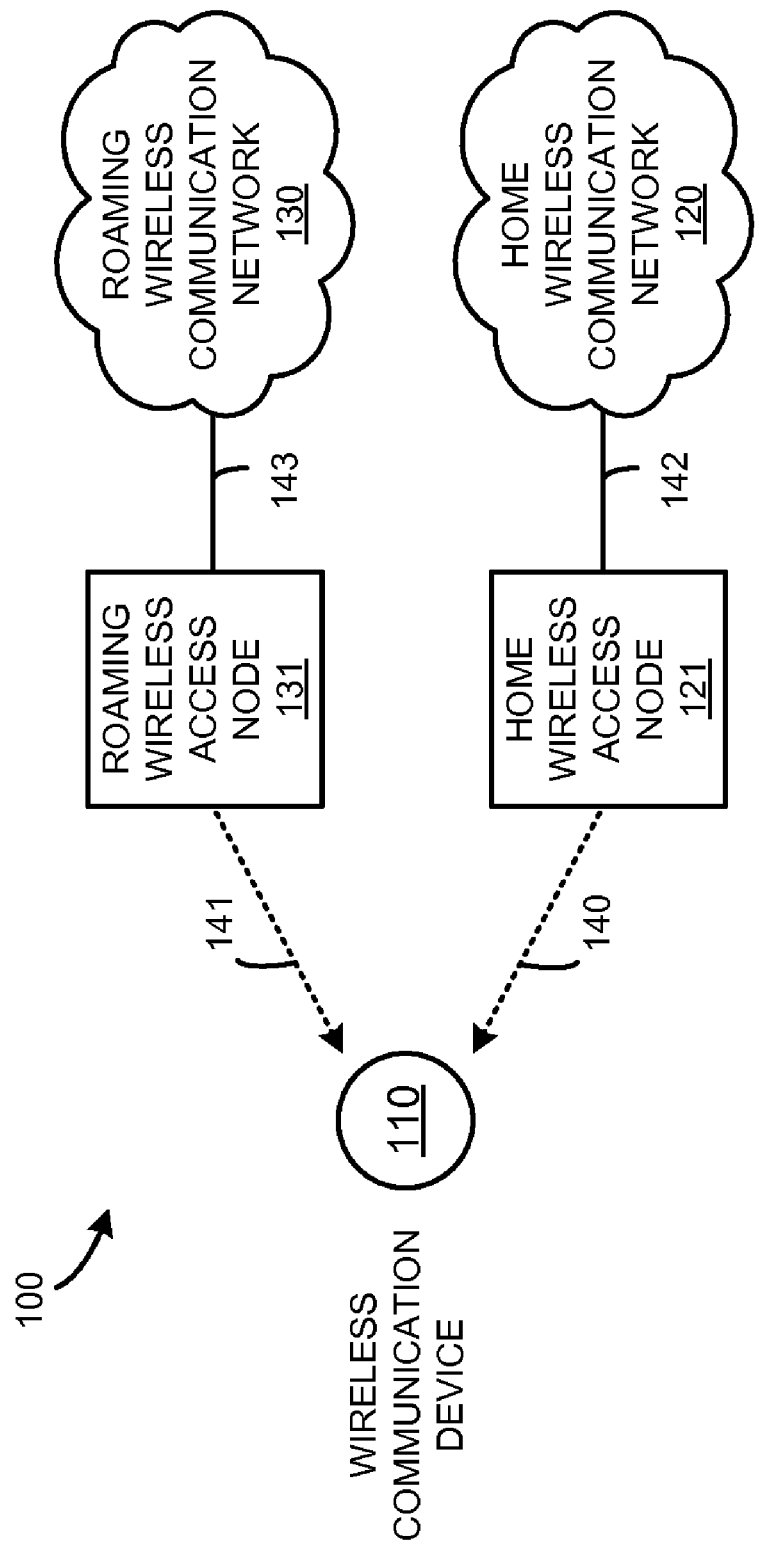
FIG. 1 is a system diagram illustrating a communication system.

FIG. 1 is a system diagram illustrating communication system 100. Communication system 100 includes wireless communication device (WCD) 110, home wireless communication network 120, home wireless access node 121, roaming wireless communication network 130, and roaming wireless access node 131. Wireless communication device 110 and home wireless access node 121 can communicate over wireless link 140. Wireless communication device 110 and roaming wireless access node 131 can communicate over wireless link 141. Home wireless access node 121 and home wireless communication network 120 communicate over 142. Roaming wireless access node 131 and roaming wireless communication network 130 communicate over link 143.

In FIG. 1, wireless link 140 represents wireless access to communication services from home wireless communication network 120, while wireless link 141 represents wireless access to communication services from roaming wireless communication network 130. Wireless communication device 110 can receive home wireless access over a first wireless communication mode through wireless access node 121 via wireless link 140, and can receive roaming wireless access over a second wireless communication mode through wireless access node 131 via wireless link 141. Although only one wireless link per wireless communication network is shown in FIG. 1, it should be understood that a different representation of wireless links could be shown in FIG. 1. The communication services can include voice calls, data exchange, text messaging, or other communication services, such as those provided by either of home wireless communication network 120 or roaming wireless communication network 130. To obtain wireless access to the communication services, wireless communication device 110 typically participates in a detection, registration, or authorization process through a selected wireless access node. Wireless communication device 110 could comprise a dual-mode wireless communication device in some examples, which could communicate over the first wireless communication mode and the second wireless communication mode.

Home wireless communication network 120 includes the wireless access equipment of a home wireless communication service provider in this example, such as a wireless carrier from which wireless communication device 110 initially purchased wireless service. Roaming wireless communication network 130 includes the wireless access equipment of a non-home wireless communication service provider in this example, such as a wireless carrier which provides roaming services to wireless communication devices which initially purchased wireless service from another wireless carrier.

Figure 2:
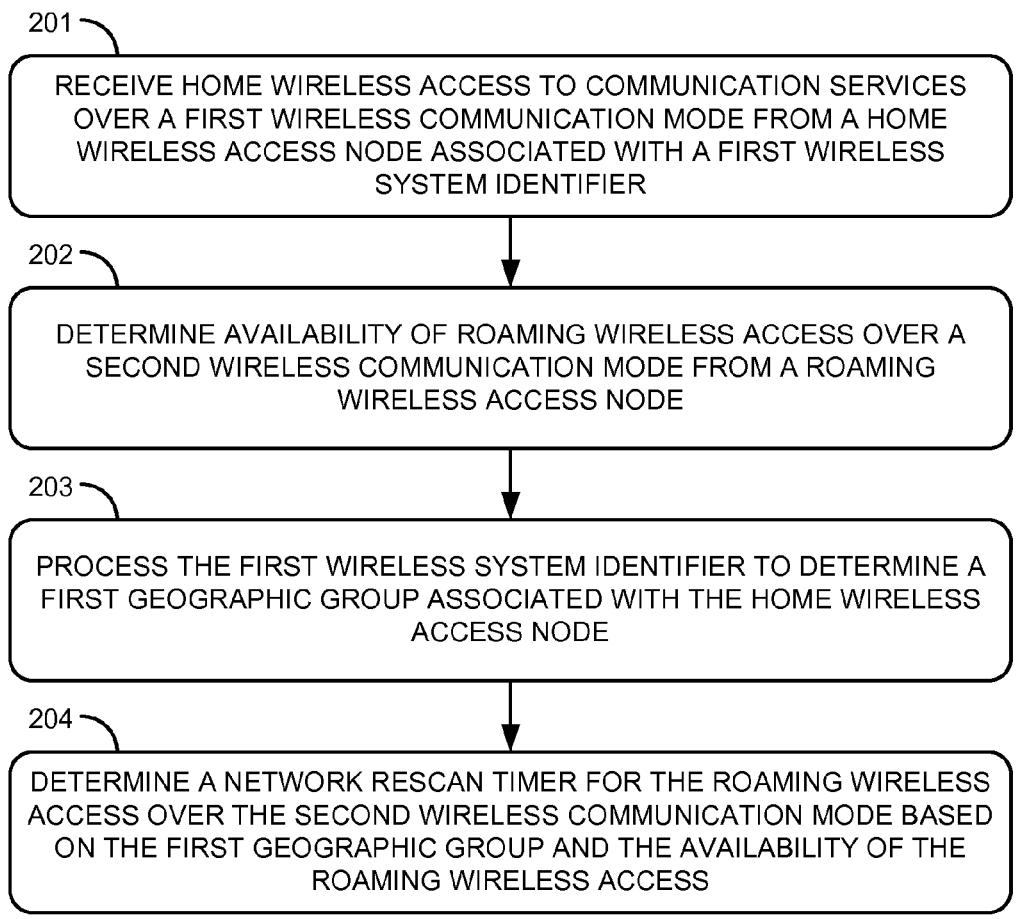
FIG. 2 is a flow diagram illustrating a method of operation of a wireless communication device.

FIG. 2 is a flow diagram illustrating a method of operating wireless communication device 110. The operations of FIG. 2 are referenced herein parenthetically. In FIG. 2, wireless communication device (WCD) 110 receives (201) home wireless access to communication services over a first wireless communication mode from home wireless access node 121 associated with a first wireless system identifier. Wireless communication device 110 receives wireless access over wireless link 140 from home wireless access node 121. Home wireless access node 121 provides non-roaming wireless access to the communication services provided by home wireless communication network 120, such as voice calls, text messages, or data exchange. Home wireless communication network 120 and home wireless access node 121 are associated with a home wireless carrier provider for wireless communication device 110. The first wireless communication mode includes a first configuration of communications over wireless link 140. The first communication mode could comprise a first wireless communication protocol, first wireless frequency spectrum, or other mode of communication between wireless communication device 110 and home wireless access node 121 over wireless link 140. The first wireless system identifier includes an identifier for home wireless access node 121, and could comprise a system identification number (SID), base station identifier (BSID), network address, geographic coordinates of the equipment of home wireless access node 121, or other identifier.

Wireless communication device 110 determines (202) availability of roaming wireless access over a second wireless communication mode from roaming wireless access node 131. In this example, wireless communication device 110 determines that roaming wireless access is available through roaming wireless access node 131 over wireless link 141. Wireless communication device 110 could determine the availability of roaming wireless access based on a pilot, beacon, or broadcast signal transferred by roaming wireless access node 131. Roaming wireless access node 131 provides roaming wireless access to the communication services provided by roaming wireless communication network 130, such as voice calls, text messages, or data exchange. Roaming wireless communication network 130 and roaming wireless access node 131 are associated with a non-home, i.e. roaming, wireless carrier provider for wireless communication device 110. The second wireless communication mode includes a second configuration of communications over wireless link 141, which could be a different wireless communication mode than that employed over wireless link 140. The second communication mode could comprise a second wireless communication protocol, second wireless frequency spectrum, or other mode of communication between wireless communication device 110 and roaming wireless access node 131 over wireless link 141.

Wireless communication device 110 processes (203) the first wireless system identifier to determine a first geographic group associated with home wireless access node 121. Wireless communication device 110 could include data structures, such as lists or tables, of wireless system identifiers correlated with various geographic groups. In this example, the first geographic group corresponds to home wireless coverage areas with geographically similar coverage as roaming wireless coverage areas. The home and roaming wireless coverage areas could be associated with wireless access nodes or wireless communication networks which provide wireless access over different wireless communication modes, such as the first wireless communication mode and the second wireless communication mode discussed above. Multiple geographic groups could be stored on a non-transient computer-readable medium in wireless communication device 110, and the first wireless system identifier could be processed against each geographic group to determine group membership for the first wireless system identifier. Since the first wireless system identifier is associated with home wireless access node 121, determining the particular geographic group associated with the first wireless system identifier corresponds to home wireless access node 121 being a member of the particular geographic group. Wireless communication device 110 typically receives the wireless system identifier over wireless link 140 from home wireless access node 121.

Wireless communication device 110 determines (204) a network rescan timer for the roaming wireless access over the second wireless communication mode based on the first geographic group and the availability of the roaming wireless access. Assuming in this example that the first wireless system identifier is found to be associated with the first geographic group, then home wireless access node 121 is also associated with the first geographic group. Also in this example, the first geographic group corresponds to a geographic area where wireless coverage of home wireless access nodes overlap with wireless coverage of roaming wireless access nodes. In this example, wireless communication device 110 determines a faster network rescan timer for the roaming wireless access over the second wireless communication mode due to the availability of the roaming wireless access and the membership of home wireless access node 121 in the first geographic group. The faster network rescan timer could include decreasing a period of a current network rescan timer, such as a default network rescan timer or a previously determined network rescan timer. In other examples, such as when home wireless access node 121 is not a part of the first geographic group or roaming wireless access is not available, then the network rescan timer might be left unmodified, or wireless communication device 110 could determine a slower network rescan rate or an increased network rescan period.

The network rescan rate comprises a counter, timer, periodic cycle, or other time-based indicator used by wireless communication device 110 to periodically search for wireless access availability. A lower or slower rescan rate would correspond to a longer rescan period, while a higher or faster rescan rate would correspond to a shorter rescan period. In typical examples, a wireless communication device initially registers for wireless access from a first wireless communication network, or element of a first wireless communication network, such as a wireless access node. The network rescan rate can indicate when the wireless communication device should rescan for wireless access availability, relative signal strength among wireless access nodes, or other parameters of nearby wireless access systems. The network rescan process can occur during periods of inactivity, such as when a wireless communication device is idle. In other examples, the network rescan rate indicates when a wireless communication device should rescan for wireless communication network availability during a present communication session, or upon termination of a present communication session, such as a voice call. The network rescan process could include searching for beacon or pilot signals transferred by various wireless access nodes within wireless range of the scanning wireless communication device, and signal strengths of the various signals could be determined. The network rescan process could also include tuning away from a present frequency spectrum or communication channel to search for other wireless communication networks on different frequency spectrums or communication channels, possibly using different wireless communication protocols or modes. In this example, wireless communication device 110 would rescan for roaming wireless access availability based on the network rescan timer determined in operation 204. The network rescan rate for the roaming wireless access over the second wireless communication mode does not indicate to scan for availability of wireless access nodes providing home wireless access over the first wireless communication mode.

Figure 3:
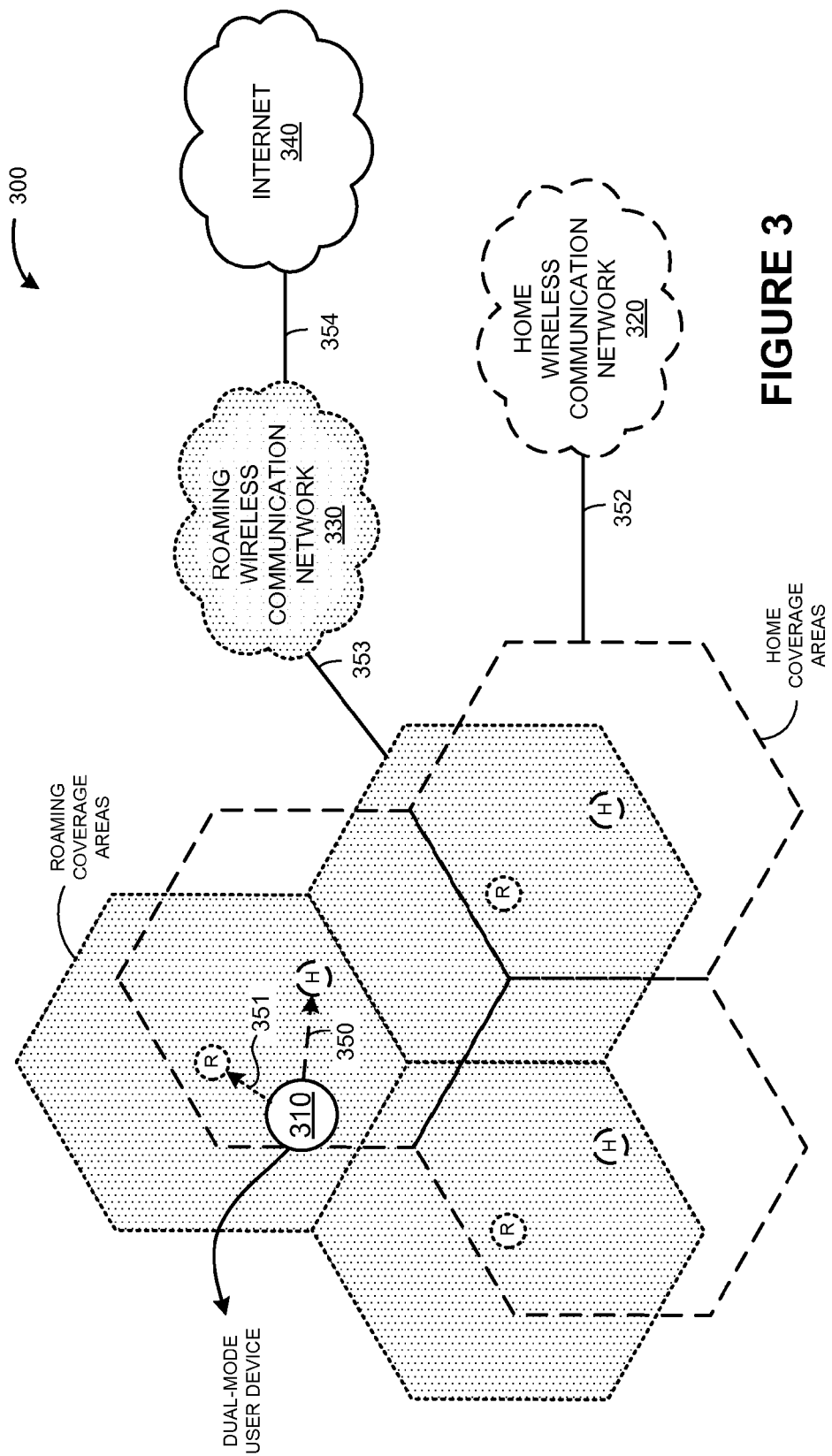
FIG. 3 is a system diagram illustrating a communication system.

FIG. 3 is a system diagram illustrating communication system 300. Communication system 300 includes dual-mode user device 310 (hereinafter user device 310), home wireless communication network 320, roaming wireless communication network 330, and Internet 340. Roaming wireless communication network 330 and Internet 340 communicate over link 354, which is a metropolitan-area optical Internet protocol (IP) network in this example.

User device 310 comprises a dual-mode user device, such as a smartphone, capable of communicating over at least two wireless communication modes, which could include communicating over two wireless communication protocols or two wireless frequency spectrums, with two different base transceiver stations. In this example, user device 310 can receive home wireless access over single-carrier radio transmission technology link (1xRTT) link 350, and can receive roaming wireless access over Evolution-Data Optimized (EVDO), link 351. Also in this example, 1xRTT communication mode is used for placing voice calls on user device 310, while the EVDO communication mode is used for data exchange.

In the example shown in FIG. 3, three hexagonal wireless coverage areas are associated with home wireless communication network 320 and partially overlap three wireless coverage areas associated with roaming wireless communication network 330. The roaming wireless coverage areas are shown as shaded hexagonal areas, and the home wireless coverage areas are shown as non-shaded hexagonal wireless coverage areas. It should be understood that a different number, configuration, shape, or shading of wireless coverage areas could be employed, and this example is merely exemplary of overlapping wireless coverage areas for multiple wireless carriers. Each hexagonal wireless coverage area includes an 'R' or 'H' indicator which represents a roaming (R) or home (H) base transceiver station (BTS) providing wireless access in each of the associated wireless coverage areas. Home wireless communication network 320 and the associated home base transceiver stations for each of the three non-shaded home coverage areas communicate over backhaul link 352, which comprises T1 communication links in this example. Roaming wireless communication network 330 and the associated roaming base transceiver stations for each of the three shaded roaming coverage areas communicate over backhaul link 353, which comprises T1 communication links in this example. In FIG. 3, one link represents all backhaul communications between the wireless communication network and the associated BTS in each of the wireless coverage areas. Although one link per wireless network is shown for clarity, it should be understood that individual backhaul links for each BTS could have been shown in FIG. 3.

Home wireless communication network 320 includes the wireless access equipment of a home wireless communication service provider in this example, such as a wireless carrier from which user device 310 initially purchased wireless service. Home wireless communication network 320 could also provide roaming services to other wireless communication devices, such as devices initially purchased through the wireless carrier associated with roaming wireless communication network 330. Roaming wireless communication network 330 includes the wireless access equipment of a non-home wireless communication service provider in this example, such as a wireless carrier which provides roaming services to wireless communication devices which initially purchased wireless service from another wireless carrier. Home wireless communication network 320 and roaming wireless communication network 330 each include equipment and systems to provide wireless access to communication services for wireless communication devices over a geographic area. Home wireless communication network 320 and roaming wireless communication network 330 and the associated wireless coverage areas could each comprise base stations, base transceiver stations (BTS), radio node controllers (RNC), base station controllers (BSC), mobile switching centers (MSC), authentication, authorization and accounting (AAA) equipment, wireless access nodes, wireless access node controllers, routers, transceivers, or antennas, among other equipment and systems.

Internet 340 includes equipment and systems to route packet communications between endpoints using the Internet protocol (IP). Internet 340 could comprise routers, switches, gateways, or bridges, as well as various interconnecting network links.

Figure 4:
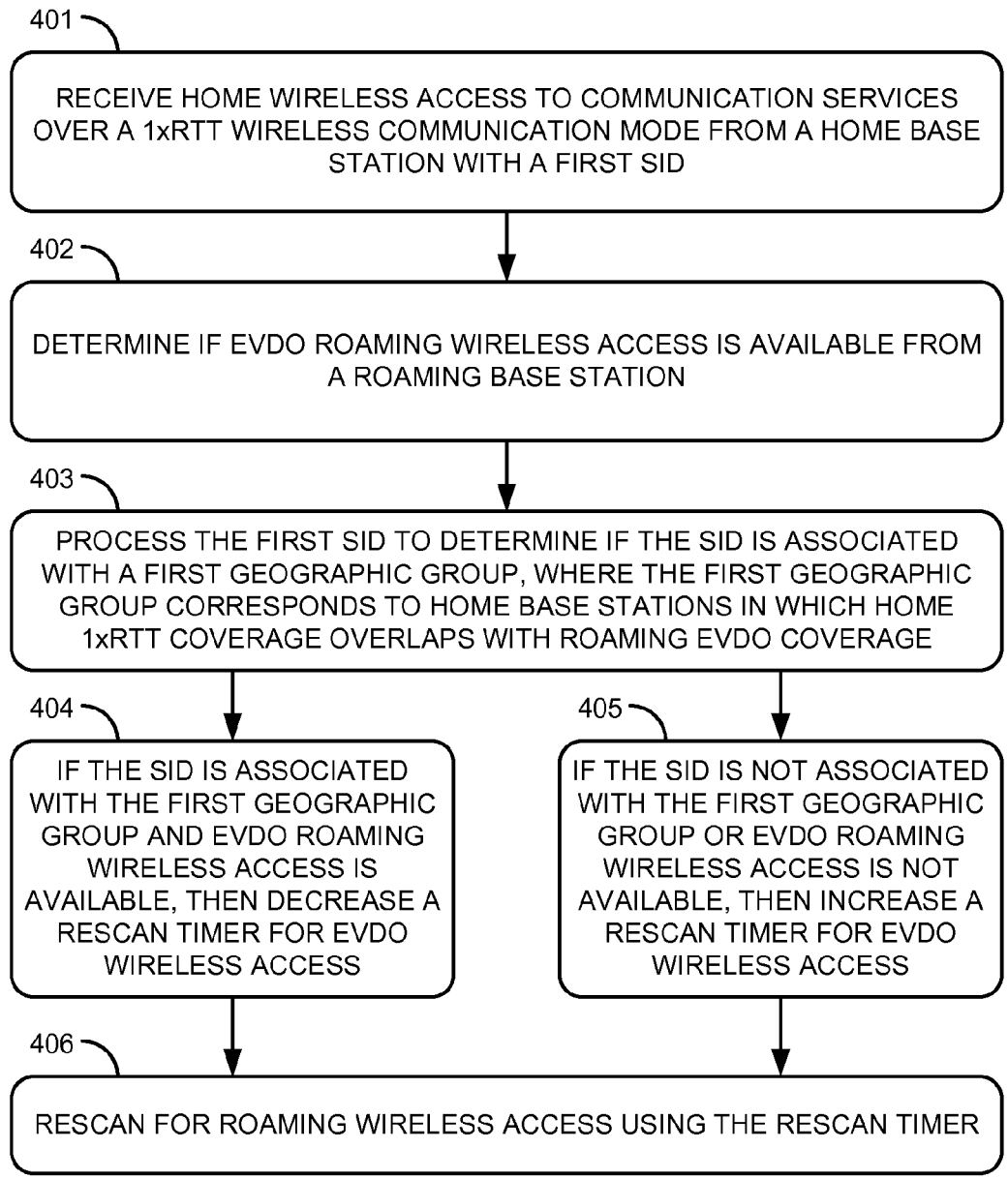
FIG. 4 is a flow diagram illustrating a method of operation of a wireless communication device.

FIG. 4 is a flow diagram illustrating a method of operating a wireless communication device, namely dual-mode user device 310. The operations of FIG. 4 are referenced herein parenthetically. In FIG. 4, user device 310 receives (401) home wireless access to communication services over a 1xRTT wireless communication mode from a home base station with a first system identification number (SID). User device 310 receives wireless access over wireless link 350 from a home BTS indicated by the 'H' in the associated hexagonal coverage area. The home BTS provides user device 310 with home, i.e. non-roaming, wireless access to the communication services provided by home wireless communication network 320, such as voice calls, text messages, or data exchange. Home wireless communication network 320 and the associated home BTS comprise the equipment of a home wireless carrier provider. The system identification number (SID) for the home BTS through which user device 310 receives wireless access identifies the home BTS. The SID for the home BTS is received by user device 310 during a registration process for the wireless access, such as over a beacon signal, pilot signal, or overhead communication channel transferred by the home BTS.

User device 310 determines (402) if EVDO roaming wireless access is available from a roaming base station. In this example, user device 310 determines that roaming wireless access is available through a roaming BTS over wireless link 351, as indicated by the 'R' in the associated shaded hexagonal coverage area. User device 310 determines the availability of roaming wireless access based on a beacon or pilot signal transferred by the roaming BTS associated with wireless link 351. The roaming BTS provides user device 310 with roaming wireless access to the communication services provided by roaming wireless communication network 330, such as Internet access to Internet 340 in this example. Roaming wireless communication network 330 and the roaming wireless coverage areas shown in FIG. 3 are the equipment of a non-home, i.e. roaming, wireless carrier provider for user device 310. In this example, the roaming wireless access over wireless link 351 is provided over the EVDO wireless communication mode.

User device 310 processes (403) the first SID to determine if the SID is associated with a first geographic group, where the first geographic group corresponds to home base stations in which home 1xRTT coverage overlaps with roaming EVDO coverage. User device 310 includes a table of SIDs correlated to various geographic groups stored on a non-transient computer-readable medium, such as flash memory device. In this example, the first geographic group corresponds to a geographic area or region where home wireless coverage areas providing wireless access over the 1xRTT wireless communication mode overlap or are in close proximity with roaming wireless coverage areas providing wireless access over the EVDO wireless communication mode. As shown in FIG. 3, three hexagonal home wireless coverage areas partially overlap with three shaded hexagonal roaming wireless coverage areas, although other configurations could be encountered. Each wireless coverage area in FIG. 3 is associated with a BTS or collection of BTSs which provide wireless access over the associated wireless coverage area. In this example, multiple geographic groups are stored in user device 310, and the first SID is processed against each geographic group to determine group membership for the first SID, such as performing a lookup of the SID against the tables associated with the geographic groups. Since the first SID is associated with the home BTS providing wireless access over wireless link 350, determining the particular geographic group associated with the first SID corresponds to the particular home BTS being a member of the particular geographic group.

If the first SID is associated with the first geographic group and EVDO roaming wireless access is available, then user device 310 decreases (404) a rescan timer for EVDO wireless access. If the first SID is found to be associated with the first geographic group, then the home BTS which provided the first SID is also associated with the first geographic group. User device 310 then determines a faster rescan timer for the roaming wireless access over the EVDO communication mode due to the availability of the roaming wireless access over wireless link 351 and the membership of the home BTS associated with the first SID in the first geographic group which indicates a geographic area with overlapping home and roaming wireless coverage areas. The faster rescan timer includes decreasing a current network rescan timer, such as a decreasing the period of a default network rescan timer or a previously determined network rescan timer. The amount of decrease in the rescan timer could be based on a predetermined amount, or could be based on the SID and first geographic group. For example, if a higher density of roaming wireless coverage areas is associated with the home wireless coverage areas or first SID, then a greater decrease in the rescan timer could be determined.

If the first SID is not associated with the first geographic group or EVDO roaming wireless access is not available, then user device 310 increases (405) a rescan timer for EVDO wireless access. If the first SID is found to not be associated with the first geographic group, then the home BTS which provided the first SID is also not associated with the first geographic group, which may indicate that the first SID does not correspond to a BTS in a geographic area with overlapping home and roaming wireless coverage areas, among other configurations. User device 310 then determines a slower rescan timer for the roaming wireless access over the EVDO communication mode due to the lack of availability of the roaming wireless access over wireless link 351 and the home BTS associated with the first SID not being a member of the first geographic group. The slower rescan timer includes increasing a current network rescan timer, such as increasing the period of a default network rescan timer or a previously determined network rescan timer. In other examples, the rescan timer might be left unmodified. The amount of increase in the rescan timer could be based on a predetermined amount, or could return a previously decreased rescan timer to a default period.

User device 310 then rescans (406) for roaming wireless access using the rescan timer. If the rescan timer was modified in operation 404, then the modified rescan timer is used to rescan for roaming wireless access. If the rescan timer was modified or unmodified in operation 405, then that rescan timer is used to rescan for roaming wireless access. Rescanning for roaming wireless access includes checking for availability of roaming wireless access from roaming BTS equipment, such as by checking beacon or pilot signals transferred by nearby roaming BTS transceivers. In further examples, user device 310 acquires the roaming wireless access over the EVDO wireless communication mode from a roaming BTS. The roaming BTS could be selected as the roaming BTS detected over wireless link 351, or could be another roaming BTS associated with roaming wireless communication network 330, such as based on a received signal strength of various roaming BTS equipment. User device 310 could then exchange communications through the selected roaming BTS, such as exchange communications with Internet 340 over roaming wireless communication network 330 and the selected roaming BTS in the EVDO wireless communication mode. After the communications exchange, user device 310 could then scan or rescan for further wireless access availability over the EVDO communication mode based on the network rescan timer.

In further examples, user device 310 determines a battery level status of a battery portion of user device 310. The battery level status could correspond to the amount of energy, charge, or power remaining in a battery contained within user device 310. User device 310 could further process geographic group, roaming wireless access availability, and the battery level status to determine the network rescan rate. In some examples, when the battery level status indicates a low battery, the network rescan rate could be decreased to reduce the level of power required by user device 310 by reducing the quantity of rescans performed. Additionally, the network rescan rate could be increased only when user device 310 has a battery level status which exceeds a battery level threshold.

Figure 5:
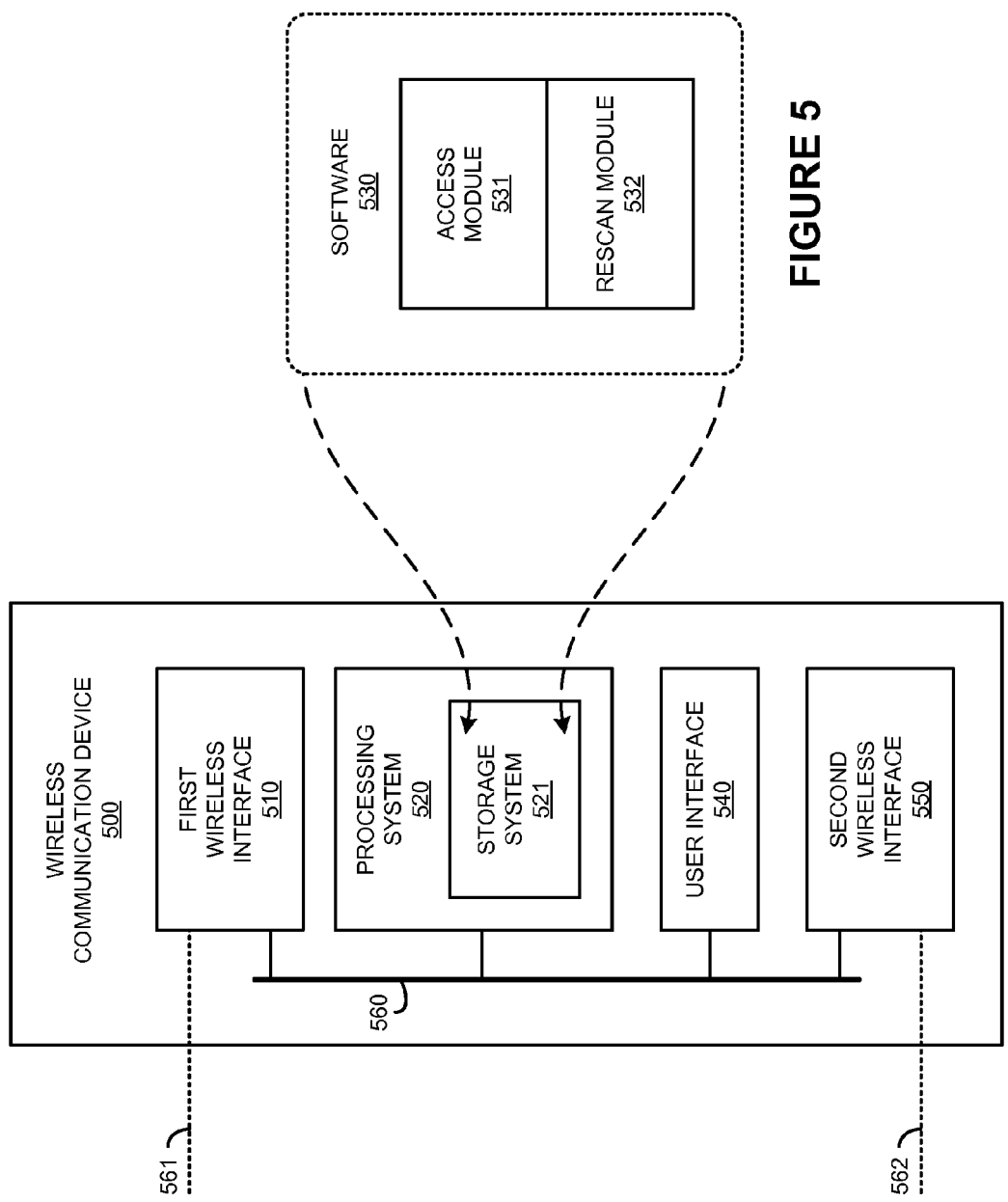
FIG. 5 is a block diagram illustrating a wireless communication device.

FIG. 5 is a block diagram illustrating wireless communication device 500, as an example of wireless communication device 110 found in FIG. 1 or dual-mode user device 310 found in FIG. 3, although wireless communication device 110 or user device 310 could use other configurations. Wireless communication device 500 includes, first wireless interface 510, processing system 520, user interface 540, and second wireless interface 550. First wireless interface 510, processing system 520, user interface 540, and second wireless interface 550 are shown to communicate over a common bus 560 for illustrative purposes. It should be understood that discrete links could be employed, such as network links or other circuitry. Wireless communication device 500 may be distributed or consolidated among equipment or circuitry that together forms the elements of wireless communication device 500.

First wireless interface 510 comprises a communication interface for communicating with wireless access nodes of a wireless communication network, such as with base stations of a cellular voice and data network. First wireless interface 510 could include transceiver equipment and antenna elements for wirelessly exchanging user communications and overhead communications over the associated wireless link 561. First wireless interface 510 also receives command and control information and instructions from processing system 520 or user interface 540 for controlling the operations of wireless communications over wireless link 561. Wireless link 561 could use various protocols or communication formats as described herein for wireless links 140-141 or 350-351, including combinations, variations, or improvements thereof.

Processing system 520 includes storage system 521. Processing system 520 retrieves and executes software 530 from storage system 521. In some examples, processing system 520 is located within the same equipment in which first wireless interface 510, user interface 540, or second wireless interface 550 are located. In further examples, processing system 520 comprises specialized circuitry, and software 530 or storage system 521 could be included in the specialized circuitry to operate processing system 520 as described herein. Storage system 521 could include a non-transitory computer-readable medium such as a disk, tape, integrated circuit, server, flash memory, or some other memory device, and also may be distributed among multiple memory devices.

Software 530 may include an operating system, logs, utilities, drivers, networking software, tables, databases, data structures, and other software typically loaded onto a computer system. Software 530 could contain application programs, server software, firmware, or some other form of computer-readable processing instructions. When executed by processing system 520, software 530 directs processing system 520 to operate as described herein, such as determine availability of wireless access, direct wireless communications with wireless access nodes, and determine rescan timers based on wireless system identifiers and geographic information, among other operations.

In this example, software 530 includes access module 531 and rescan module 532. It should be understood that a different configuration could be employed, and individual modules of software 530 could be included in different equipment in wireless communication device 500. Access module 531 determines if wireless access nodes are available to provide wireless access to communication services. Access module 531 communicates with first wireless interface 610 or second wireless interface 650 to determine availability of the wireless access, to receive the wireless access to communication services, and receive wireless system identifiers from wireless access nodes. Rescan module 532 processes wireless system identifiers, geographic information for wireless access nodes, and availability of wireless access to determine network rescan timers for wireless communication device 500. The network rescan timer could be applied to any of first wireless interface 610 or second wireless interface 650.

User interface 540 includes equipment and circuitry for receiving user input and control, such as for engaging in voice calls or data sessions, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 540 also includes equipment to communicate information to a user of wireless communication device 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Second wireless interface 550 comprises a communication interface for communicating with user devices over a wireless link. Second wireless interface 550 could include transceiver equipment and antenna elements for wirelessly exchanging user communications and overhead communications over the associated wireless link 562. Second wireless interface 550 also receives command and control information and instructions from processing system 520 or user interface 540 for controlling the operations of wireless communications over wireless link 562. Wireless link 562 could use various protocols or communication formats as described herein for wireless links 140-141 or 350-351, including combinations, variations, or improvements thereof. In some examples, first wireless interface 510 and second wireless interface 550 are included in similar circuitry.

Bus 560 comprises a physical, logical, or virtual communication link, capable of communicating data, control signals, and communications, along with other information. In some examples, bus 560 is encapsulated within the elements of first wireless interface 510, processing system 520, user interface 540, or second wireless interface 550, and may be a software or logical link. In other examples, bus 560 uses various communication media, such as air, space, metal, optical fiber, or some other signal propagation path, including combinations thereof. Bus 560 could be a direct link or might include various equipment, intermediate components, systems, and networks.

Referring back to FIG. 1, wireless communication device 110 comprises transceiver circuitry and communication elements. The transceiver circuitry typically includes amplifiers, filters, modulators, and signal processing circuitry. Wireless communication device 110 may also include user interface systems, memory devices, non-transitory computer-readable storage mediums, software, processing circuitry, or some other communication components. Wireless communication device 110 may be a user device, wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof. Although one wireless communication device is shown in FIG. 1, it should be understood that a different number of wireless communication devices could be included. Wireless communication device 110 could include multiple transceiver portions or antenna portions, among other circuit and equipment elements, for communicating wirelessly with multiple wireless communication networks, using different wireless communication modes or wireless communication protocols. For example, wireless communication device 110 could be a dual-mode device capable of communicating with home wireless communication network 120 and roaming wireless communication network 130, or different elements thereof.

Home wireless communication network 120 comprises communication and control systems for providing access to communication services for user devices. In some examples, home wireless communication network 120 includes equipment to provide wireless access to communication services within different coverage areas to user devices, route communications between content providers and user devices, and receive and process registration and content requests, among other operations. Home wireless communication network 120 may also comprise wireless access nodes, wireless access node controllers, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, wireless data access points, routers, databases, or other communication and control equipment.

Home wireless access node 121 is associated with home wireless communication network 120 in this example, and provides wireless access to the communication services of home wireless communication network 120. Home wireless access node 121 comprises RF communication and control circuitry, transceivers, and antennas, as well as wireless communications equipment capable of communicating with and providing wireless access within a wireless coverage area to communication services for wireless communication devices, such as wireless communication device 110, using at least a first wireless communication mode. The RF communication circuitry typically includes amplifiers, filters, RF modulators, transceivers, and signal processing circuitry. Home wireless access node 121 may also comprise a base station or base transceiver station (BTS).

Roaming wireless access node 131 is associated with roaming wireless communication network 130 in this example, and provides wireless access to the communication services of roaming wireless communication network 130. Roaming wireless access node 131 comprises RF communication and control circuitry, transceivers, and antennas, as well as wireless communications equipment capable of communicating with and providing wireless access within a wireless coverage area to communication services for wireless communication devices, such as wireless communication device 110, using at least a second wireless communication mode. The RF communication circuitry typically includes amplifiers, filters, RF modulators, transceivers, and signal processing circuitry. Roaming wireless access node 131 may also comprise a base station or base transceiver station (BTS).

Communication links 142-143 each use metal, glass, optical, air, space, or some other material as the transport media. Communication links 142-143 could each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 142-143 could each be direct links or may include intermediate networks, systems, or devices, and could each include a logical network link transported over multiple physical links.

Wireless links 140-141 each use the air or space as the transport media. Wireless links 140-141 may each use various protocols, such as Code Division Multiple Access (CDMA), Evolution-Data Optimized (EVDO), single-carrier radio transmission technology link (1xRTT), Worldwide Interoperability for Microwave Access (WiMAX), Global System for Mobile Communication (GSM), Universal Mobile Telecommunications System (UMTS), Long Term Evolution (LTE), Wireless Fidelity (Wi-Fi), High Speed Packet Access (HSPA), Radio Link Protocol (RLP), or some other wireless communication format, including combinations, improvements, or variations thereof. Although two main wireless links 140-141 are shown in FIG. 1, it should be understood that wireless links 140-141 are merely illustrative to show communication modes or wireless access pathways for wireless communication device 110. In other examples, further wireless links could be shown, with portions of the further wireless links shared and used for different communication sessions and associated overhead communications.

Communication links 140-143 may each include many different signals sharing the same associated link, as represented by the associated lines in FIG. 1, comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device, the method comprising:
receiving home wireless access to communication services over a first wireless communication mode from a home wireless access node associated with a first wireless system identifier, and determining availability of roaming wireless access over a second wireless communication mode from a roaming wireless access node;
processing the first wireless system identifier to determine a first geographic group associated with the home wireless access node, wherein the first geographic group comprises a plurality of home wireless access nodes providing wireless access over the first wireless communication mode which are in geographic areas with wireless coverage of wireless access nodes providing home wireless access over the second wireless communication mode and with wireless coverage of wireless access nodes providing roaming wireless access over the second wireless communication mode; and
determining a network rescan timer for the roaming wireless access over the second wireless communication mode based on the first geographic group and the availability of the roaming wireless access by at least determining if the home wireless access node is a member of the first geographic group and determining if the roaming wireless access is available.

2. The method of claim 1, wherein the first wireless communication mode comprises a single-carrier radio transmission technology link (1xRTT) wireless communication mode, and the second wireless communication mode comprises an Evolution-Data Optimized (EVDO) wireless communication mode.

3. The method of claim 1, wherein the home wireless access node comprises a home base transceiver station (BTS), and wherein the first wireless system identifier comprises a system identification number (SID) of the home BTS.

4. The method of claim 1, wherein the network rescan timer indicates to scan for availability of wireless access nodes providing wireless access over the second wireless communication mode and does not indicate to scan for availability of wireless access nodes providing wireless access over the first wireless communication mode.

5. The method of claim 1, wherein if the home wireless access node is a member of the first geographic group and if the roaming wireless access is available, then decreasing the network rescan timer.

6. The method of claim 1, wherein if the home wireless access node is not a member of the first geographic group or if the roaming wireless access is not available, then increasing the network rescan timer.

7. The method of claim 1, wherein determining availability of the roaming wireless access over the second wireless communication mode from the roaming wireless access node comprises acquiring the roaming wireless access over the second wireless communication mode from the roaming wireless access node.

8. The method of claim 1, further comprising:
scanning for further wireless access availability over the second wireless communication mode based on the network rescan timer.

9. A wireless communication device, comprising:
a first transceiver configured to receive home wireless access to communication services over a first wireless communication mode from a home wireless access node associated with a first wireless system identifier;
a second transceiver configured to determine availability of roaming wireless access over a second wireless communication mode from a roaming wireless access node;
a processing system configured to process the first wireless system identifier to determine a first geographic group associated with the home wireless access node, wherein the first geographic group comprises a plurality of home wireless access nodes providing wireless access over the first wireless communication mode which are in geographic areas with wireless coverage of wireless access nodes providing home wireless access over the second wireless communication mode and with wireless coverage of wireless access nodes providing roaming wireless access over the second wireless communication mode; and
the processing system configured to determine a network rescan timer for the roaming wireless access over the second wireless communication mode based on the first geographic group and the availability of the roaming wireless access by at least determining if the home wireless access node is a member of the first geographic group and determining if the roaming wireless access is available.

10. The wireless communication device of claim 9, wherein the first wireless communication mode comprises a single-carrier radio transmission technology link (1xRTT) wireless communication mode, and the second wireless communication mode comprises an Evolution-Data Optimized (EVDO) wireless communication mode.

11. The wireless communication device of claim 9, wherein the home wireless access node comprises a home base transceiver station (BTS), and wherein the first wireless system identifier comprises a system identification number (SID) of the home BTS.

12. The wireless communication device of claim 9, wherein the network rescan timer indicates to the second transceiver to scan for availability of wireless access nodes providing wireless access over the second wireless communication mode and does not indicate to the first transceiver to scan for availability of wireless access nodes providing wireless access over the first wireless communication mode.

13. The wireless communication device of claim 9, wherein if the home wireless access node is a member of the first geographic group and if the roaming wireless access is available, then the processing system is configured to decrease the network rescan timer.

14. The wireless communication device of claim 9, wherein if the home wireless access node is not a member of the first geographic group or if the roaming wireless access is not available, then the processing system is configured to increase the network rescan timer.

15. The wireless communication device of claim 9, wherein the second transceiver is configured to acquire the roaming wireless access over the second wireless communication mode from the roaming wireless access node to determine availability of the roaming wireless access over the second wireless communication mode from the roaming wireless access node.

16. The wireless communication device of claim 9, comprising:
the second transceiver configured to scan for further wireless access availability over the second wireless communication mode based on the network rescan timer.

* * * * *